United States Patent Office 3,470,140
Patented Sept. 30, 1969

3,470,140
POLY-2-ARYLCARBAMOYL BENZIMIDAZOLES AND PROCESS OF PREPARING SAME
Robert Salle, Bernard Sillion, and Gabriel de Gaudemaris, Grenoble, France, assignors to Institut Francais du Petrole des Carburants et Lubrifiants, Rueil-Malmaison, Hauts-de-Seine, France
No Drawing. Filed July 5, 1967, Ser. No. 651,140
Claims priority, application France, July 4, 1966, 68,120
Int. Cl. C08g 20/00
U.S. Cl. 260—78            6 Claims

ABSTRACT OF THE DISCLOSURE

Poly-2-arylcarbamoyl benzimidazoles having the general formula:

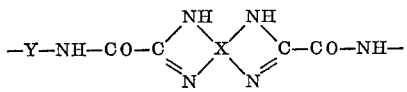

wherein X is a tetravalent aromatic or unsaturated heterocyclic radical, preferably comprising from 4 to 14 carbon atoms, Y is a divalent aromatic or unsaturated heterocyclic radical, preferably containing 4 to 14 carbon atoms, and the carbon atoms linked with the nitrogen atoms are necessarily vicinal two by two, in order that the heterocycle

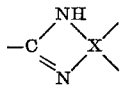

be an imidazole, are produced by reacting an arylene bis-oxamate having the general formula $$RO_2C-CO-NH-Y-NH-CO-CO_2R$$

with an aromatic tetramine having the general formula:

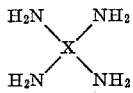

wherein R is a monovalent hydrocarbon radical and X and Y are as defined above, at a temperature of about 100 to 300° C., said polymers having utility as composite materials with glass cloths and adhesives.

---

This invention relates to polymers comprising in their chain benzimidazole nuclei connected therebetween by arylcarbamoyl groups.

Their structure is given by the following general formula:

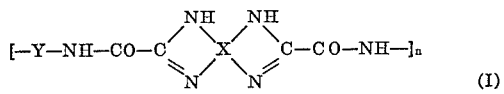

(I)

In this formula, X is a tetravalent aromatic or unsaturated heterocyclic radical, preferably comprising from 4 to 14 carbon atoms, wherein the carbon atoms linked with the nitrogen atoms are necessarily vicinal two by two, in order that the heterocycle

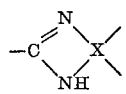

be an imidazole. Y represents a divalent aromatic or unsaturated heterocyclic radical, preferably containing 4–14 carbon atoms. n is an integer giving the polycondensation degree. Since this number cannot be determined easily, the polymers will be characterized by their viscosity.

As aromatic compounds which may bear 4 free valences and constitute a tetravalent X radical, the following will be mentioned: benzene, toluene, paraxylene, ethylbenzene, naphthalene, diphenyl, diphenylmethane, benzophenone, diphenylsulfide, diphenyloxide, diphenyl sulfone, pyridine, thiofene and furan.

The aromatic compounds which may bear 2 free valences and constitute divalent Y radicals are preferably the following: benzene, toluene, xylenes (ortho, meta, para), ethylbenzene, naphthalene, diphenyl, diphenylmethane, benzophenone, diphenyl oxide, diphenylsulfide, diphenylsulfone, pyridine, pyrazine, thiofene and furan.

The poly 2-arylcarbamoyl benzimidazoles, which constitute an object of this invention, are obtained by reaction of the arylenes bis-oxamates of Formula II with the aromatic tetraamines of Formula III, according to the scheme:

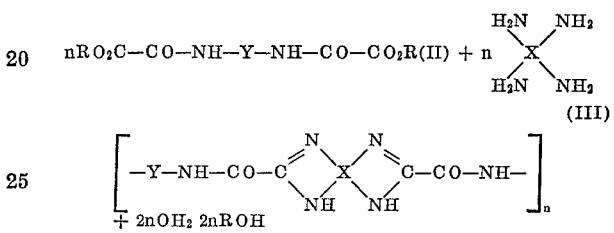

R is a hydrocarbon monovalent radical, preferably alkyl of 1–12 carbon atoms, cycloalkyl of 5–12 carbon atoms or aryl of 6–10 carbon atoms, for example methyl, ethyl, isopropyl, n.hexyl, isooctyl, cyclopentyl, cyclohexyl, dimethylcyclohexyl, cyclooctyl, phenyl, metatolyl, orthotolyl, xylyl, m.ethylphenyl, naphthyl.

All arylenes bis (alkyl or aryl oxamates) of Formula II may be used in this invention; the following may be named by way of non-limitative examples:

the m. and p.phenylene bis (ethyl or phenyl oxamates)
the 4,4-biphenylene bis (ethyl oxamate)
the 4,4'-methylene biphenylene bis (ethyl oxamate)
the 1,4-naphthalene bis (methyl oxamate)
the 4,4'-oxybiphenylene bis (ethyl oxamate)
the 4,4'-sulfonybiphenylene bis (ethyl oxamate)
the 2-methyl-1,4-phenylene bis (isopropyl oxamate)
the 2,6-dimethyl-1,3-phenylene bis (n.hexyl oxamate)
the 4,4'-benzophenone bis (cyclohexyl oxamate)
the 2,6-pyridine bis (orthotolyl oxamate)
the 2,5-furan bis (methyl oxamate)

These oxamic esters may be manufactured by known methods (for example French Patent 1,337,445 from Aug. 1, 1962, and U.S. Patent 2,945,011 from Aug. 23, 1956).

The aromatic tetraamines III which may be used must comprise two reactive o.diamino centers, these two reactive centers being:

either on the same nucleus, as 1,2,4,5-tetraamine-benzene, 2,3,5,6-tetraamino toluene, 2,3,5,6-tetraamino paraxylene, or on two condensed rings, as for example 1,2,5,6-tetraamino naphthalene or 2,3,6,7-tetraamino naphthalene, or again on different cycles, as for example 3,3'-diaminobenzidine, 3,3',4,4'-tetraamino diphenylmethane, 3,3', 4,4'-tetraamino diphenyl sulfone, 3,3',4,4'-tetraamino benzophenone, 3,3',4,4'-tetraamino diphenylsulfide, 3,3'-4,4'-tetraamino diphenyloxide, or finally on heterocycles, as for example 2,3,5,6-tetraamino pyridine, 2,3,5,6-tetraamino pyrazine, 2,3,4,5-tetraamino thiofene and 2,3,4,5-tetraamino furan.

The polymerization reactions are carried out by heating under inert atmosphere (inert gas or vacuum), of preferably stoichiometric amounts of the reactants at a temperature of about 100–300° C., preferably 175–250° C. The reactants may be fused or preferably dissolved in organic solvents, and the reaction is preferably carried out at reflux of high boiling point and acidic organic solvents (phenols). The hydroxylated aromatic solvents such as metacresol or parachlorophenol are particularly convenient for these reactions.

In the preferred process, the heating at reflux is maintained for about 20 hours; the polymers are precipitated from the solution by addition of an excess of a non-solvent such as ethanol, then filtered, washed and dried. They appear as powders of yellow to brown color. A further heating may be carried out, for example at 300° C. under vacuum, to end the polymerization.

The structure of these polymers may be shown by elementary analysis and infra-red determinations.

These polymers may be used as composite materials, for example with glass clothes. They may also be used as basis for adhesives. For this latter use, prepolymers will be preferably used having inherent viscosities comprised between 0.05 and 0.2 (for example in metacresol at 0.5% by weight concentration of polymer). These prepolymers are easily obtained by limiting the polycondensation reaction. With these prepolymers, a composition may be manufactured also including conventional additives, this composition may be used to bind various materials.

Materials which have been impregnated with the prepolymer may be submitted to a thermal treatment by heating over 200° C. and preferably over 300° C., so as to convert the prepolymers to polymers of Formula I.

Polymers of Formula I are infusible and insoluble in usual solvents; a study of their thermal stability shows a limit of thermal stability at about 350° C. under inert atmosphere and 320° C. in air.

The following non-limitative examples are given by way of illustration, not of limitation.

EXAMPLE 1

30.8 g. (0.1 mole) of m.phenylene bis (ethyl oxamate) of melting point 154° C. are dissolved under inert atmosphere in 400 ml. of freshly distilled m.cresol. To this stirred solution, 21.4 g. (0.1 mole) of recrystallized 3,3′-diaminobenzidine are added. The solution is brought to reflux of m.cresol, under inert gas atmosphere; after 3 to 4 hours, the polymer partially precipitates; the heating is maintained for 24 hours and, after cooling down, 1500 ml. of ethanol are added. The thus precipitated polymer is filtered, washed with ethanol and dried under vacuum at 100° C. There is obtained 36.3 g. (91%) of a yellow powder which is heated at 300° C. for 2 hours under $10^{-2}$ mm. Hg pressure.

The infra-red spectrum of the polymer remains unchanged during this treatment. The inherent viscosity of the polymer, as measured at 30° with 0.5% by weight concentration in m.cresol, is 0.42.

EXAMPLE 2

To a solution of 39.8 g. (0.1 mole) of 4,4′-methylene biphenylene bis (ethyl oxamate) of melting point 152° C. in 500 ml. of m.cresol, 21.4 g. (0.1 mole) of 3,3′-diaminobenzidine are added, under inert atmosphere. After heating at reflux for 20 hours, 1200 ml. of ethanol are added and the resulting precipitate is dried at 100° under vacuum. 44 g. of a yellow polymer are obtained, the inherent viscosity of which is 0.36 (determined at 30° C. on a solution of 0.5% concentration in formic acid).

EXAMPLE 3

19.2 g. (0.05 mole) of 4,4′-biphenylene bis (ethyl oxamate) of melting point 225° C. are dissolved into 250 ml. of freshly distilled p.chlorophenol. To this solution which is maintained under inert atmosphere and vigorously stirred, 10.7 g. (0.05 mole) of pure 3,3′-diaminobenzidine are added.

The solution is heated at reflux for 24 hours. During this heating step, the polymer partially precipitates out from the solution. After ethanol has been added, the product is filtered, dried under vacuum, then treated at 300° C. for 2 hours under $10^{-2}$ mm. Hg 21 g. of a yellowish brown polymer are obtained, with an inherent viscosity of 0.38 (determined at 30° C. as 0.5% solution in HCOOH).

EXAMPLE 4

In the same way, a polymerization is carried out, starting from 4.48 g. (0.01 mole) of 4,4′-sulfonyl biphenylene bis (ethyl oxamate) of melting point 263° and from 2.14 g. (0.01 mole) of 3,3′-diaminobenzidine in 50 ml. m.cresol.

Processing as in the previous example, there is obtained 4.5 g. of pale brown polymer exhibiting an inherent viscosity of 0.27 (0.5% in HCOOH at 30° C.).

EXAMPLE 5

By heating at reflux for 20 hours in 500 ml. of m.cresol of a mixture of 40 g. (0.1 mole) of 4,4′-oxybiphenylene bis (ethyl oxamate) of melting point 156° with 21.4 g. (0.1 mole) of 3,3′-diaminobenzidine, there is obtained after precipitation and heating of the polymer as described in the foregoing examples 43 g. of polymer having an inherent viscosity of 0.34 (0.5% in HCOOH at 30° C.).

EXAMPLE 6

In the same conditions as above, starting from 11.5 g. (0.05 mole) of 3,3′,4,4′-tetraamino diphenylether and from 15.4 g. (0.05 mole) of m.phenylene bis (ethyl oxamate) dissolved in 250 ml. of m.cresol, 18.5 g. of polymer are obtained with an inherent viscosity of 0.34 as measured at 0.5% concentration in formic acid at 30° C.

EXAMPLE 7

7.7 g. (0.025 mole) of m.phenylene bis (ethyl oxamate) and 5.35 g. of 3,3′-diamino benzidine are intimately admixed and the mixture is heated under inert atmosphere for 2 hours at 200° and 7 hours at 250° C. For this heating, ethanol and water escape from the reaction mixture and are swept away with the inert gas feed.

The polymer (8.5 g.) is crushed, washed with ethanol and then dried. Its inherent viscosity in formic acid is 0.21 (at 0.5% concentration and 30° C.).

EXAMPLES 8–16

In the same way as in Example 1, the following compounds of Formula I are obtained (the positions of substitution by vicinal atoms of the polymeric chain are pointed out).

| Ex. No. | X | Y |
| --- | --- | --- |
| 8 | Benzene (1,2,4,5) | Toluene (3,5). |
| 9 | Naphthalene (2,3,6,7) | Paraxylene (2,5). |
| 10 | Diphenylmethane (3,3′,4,4′) | Naphthalene (1,4). |
| 11 | Benzophenone (3,3′,4,4′) | Benzophenone (3,3′). |
| 12 | Diphenylsulfide (3,3′,4,4′) | Diphenylsulfide (3,3′). |
| 13 | Diphenyl sulfone (3,3′,4,4′) | Pyridine (2,6). |
| 14 | Pyridine (2,3,5,6) | Pyrazine (2,5). |
| 15 | Pyrazine (2,3,5,6) | Thiofene (2,4). |
| 16 | Toluene (2,3,5,6) | Furan (2,5). |

We claim:
1. A polymer consisting essentially of the recurring unit

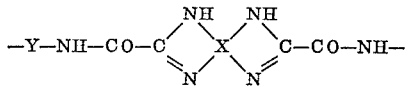

wherein X is a tetravalent aromatic radical, the carbon atoms linked with nitrogen atoms are adjacent two by two, and Y is a divalent aromatic radical, said polymer having an inherent viscosity of at least 0.05 when measured in meta-cresol at 0.5% by weight concentration of said polymer.

2. A polymer according to claim 1 wherein X contains 4-14 carbon atoms and Y contains 4-14 carbon atoms.

3. A polymer according to claim 1 wherein X is selected from the group consisting of benzene, toluene, paraxylene, ethylbenzene, naphthalene, diphenyl, diphenylmethane, benzophenone, diphenylsulfide, diphenyloxide, diphenylsulfone, pyridine, pyrazine, thiophene and furan, and Y is selected from the group consisting of benzene, toluene, xylene, ethylbenzene, naphthalene, diphenyl, diphenylmethane, benzophenone, diphenyloxide, diphenylsulfide, diphenylsulfone, pyridine, pyrazine, thiophene and furan.

4. Process for manufacturing a polymer according to claim 1, wherein an arylene bis-oxamate having the formula

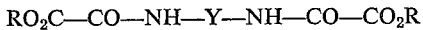

is heated at a temperature of from about 100° to 300° C. with an aromatic tetra-amine having the formula

wherein R is a monovalent hydrocarbon radical and X and Y are as defined in claim 1.

5. Process according to claim 4, wherein R is an alkyl radical of 1-12 carbon atoms, a cycloalkyl radical of 5-12 carbon atoms or an aryl radical of 6-10 carbon atoms.

6. Process according to claim 4, wherein a phenol is used as solvent.

References Cited

UNITED STATES PATENTS

Re. 26,065   7/1966   Marvel et al. _____ 260—47
3,313,783   4/1967   Iwakura et al _____ 260—78

WILLIAM H. SHORT, Primary Examiner

L. L. LEE, Assistant Examiner

U.S. Cl. X.R.

117—161; 161—197; 260—33.4, 47, 78.4